(12) United States Patent
Vogel, Jr. et al.

(10) Patent No.: US 7,974,390 B2
(45) Date of Patent: Jul. 5, 2011

(54) METHOD AND SYSTEM FOR TRANSFERRING AUDIO CONTENT TO A TELEPHONE-SWITCHING SYSTEM

(75) Inventors: Gary Dennis Vogel, Jr., Sunnyvale, CA (US); Vikas Butaney, Los Altos, CA (US)

(73) Assignee: Cisco Technology, Inc., San Jose, CA (US)

( * ) Notice: Subject to any disclaimer, the term of this patent is extended or adjusted under 35 U.S.C. 154(b) by 1489 days.

(21) Appl. No.: 11/398,886

(22) Filed: Apr. 5, 2006

(65) Prior Publication Data

US 2007/0263790 A1 Nov. 15, 2007

(51) Int. Cl.
*H04M 1/64* (2006.01)

(52) U.S. Cl. .................... 379/68; 379/88.25

(58) Field of Classification Search ............. 379/67.1, 379/88.17, 88.22, 88.23, 88.25, 221.12, 201.12, 379/212.01, 266.01, 68; 709/206
See application file for complete search history.

(56) References Cited

U.S. PATENT DOCUMENTS

| | | | |
|---|---|---|---|
| 5,945,989 A * | 8/1999 | Freishtat et al. ............. 715/760 |
| 6,011,832 A * | 1/2000 | Rice et al. .................... 379/88.16 |
| 6,035,018 A * | 3/2000 | Kaufman .................... 379/88.17 |
| 6,182,045 B1 * | 1/2001 | Kredo et al. ................. 704/270 |
| 6,298,445 B1 * | 10/2001 | Shostack et al. ............. 726/25 |
| 6,351,679 B1 * | 2/2002 | Ainslie ........................ 700/94 |
| 6,496,692 B1 * | 12/2002 | Shanahan .................... 455/418 |
| 6,741,683 B1 * | 5/2004 | Shelton et al. ............ 379/101.01 |
| 7,024,403 B2 * | 4/2006 | Kyler ........................... 1/1 |
| 7,136,461 B1 * | 11/2006 | Swingle et al. ............. 379/88.13 |
| 7,257,712 B2 * | 8/2007 | Hughes et al. ............... 713/176 |
| 7,334,001 B2 * | 2/2008 | Eichstaedt et al. .......... 1/1 |
| 7,434,047 B2 * | 10/2008 | Sharma ....................... 713/163 |
| 7,496,604 B2 * | 2/2009 | Sutton et al. ................ 1/1 |
| 7,536,725 B2 * | 5/2009 | Raciborski ................... 726/30 |
| 7,609,822 B2 * | 10/2009 | Swingle et al. ............. 379/88.25 |
| 2002/0032489 A1 * | 3/2002 | Tynan et al. ................. 700/1 |
| 2002/0184350 A1 * | 12/2002 | Chen ............................ 709/221 |
| 2003/0167407 A1 * | 9/2003 | Howard ........................ 713/201 |
| 2005/0198165 A1 * | 9/2005 | Reddel et al. ................ 709/206 |
| 2005/0256875 A1 * | 11/2005 | Rietschel ...................... 707/10 |
| 2006/0168012 A1 * | 7/2006 | Rose et al. ................... 709/206 |
| 2007/0143740 A1 * | 6/2007 | Hoerentrup et al. ......... 717/120 |
| 2007/0230669 A1 * | 10/2007 | Hazenfield .................. 379/88.22 |
| 2008/0147965 A1 * | 6/2008 | Eriksson et al. ............. 711/103 |

OTHER PUBLICATIONS

Michael Cowls, Computerized Local PABX, Oct. 19, 2001, pp. 90, University of Queensland, Australia.
MPEG Home Page, http://www.chiariglione.org/mpeg, printed Nov. 18, 2005.
Postel, Jonathan B., "RFC 821—Simple Mail Transfer Protocol" http://www.faqs.org/rfcs/rfc821.html; printed Nov. 18, 2005.

* cited by examiner

*Primary Examiner* — Olisa Anwah
(74) *Attorney, Agent, or Firm* — Fish & Richardson P.C.

(57) ABSTRACT

A method and system for transferring audio content to a telephone-switching system is provided. The telephone-switching system receives the audio content from a source. Thereafter, the telephone-switching system authenticates the source. The telephone-switching system also authenticates the audio content. Thereafter, the telephone-switching system stores the audio content in a file directory of the telephone-switching system.

22 Claims, 5 Drawing Sheets

METHOD AND SYSTEM FOR TRANSFERRING AUDIO CONTENT TO A TELEPHONE-SWITCHING SYSTEM

BACKGROUND OF THE INVENTION

1. Field of Invention

Embodiments of the invention relate, in general, to telephone-switching systems. More specifically, the embodiments of the invention relate to methods and systems for transferring audio content to the telephone-switching systems.

2. Description of the Background Art

Telephony systems are associated with the transmission of data such as voice in a communication network. The communication network includes a calling end that initiates a call with a called end. The called end has a telephone-switching system that manages the received call. For example, the called end is an organization with a Private Branch Exchange (PBX) system as the telephone-switching system. The PBX system is a telephone-switching system that utilizes the local lines of the PBX system to switch calls between enterprise users within the called end. Moreover, the PBX system provides external phone lines to make calls outside the called end. The calling end may have to wait till the PBX system establishes the call with the called end. For example, the call transfer may take some time or the called end may be busy. In this case, the call is placed on hold and the calling end has to wait till the call is established with the called end. During the time of holding the call, audio is played for the calling end. The audio that is played while the call is on hold is also known as 'music on hold'.

According to a conventional technique, an external player such as an audio player is connected to the telephone-switching system to provide the audio content. For example, a Compact Disc (CD) player is connected to a PBX system through a 3.5 mm mini audio jack or Radio Corporation of America (RCA) plugs. The external player plays the audio content for the time that the calling end has to wait. However, this technique requires an administrative interface to connect the external player to play the audio content.

According to another conventional technique, the audio is provided by connecting a computer to the PBX system. The computer includes software that automatically plays an audio file that is stored in the computer. However, this technique requires an external system such as a computer to be permanently connected to the telephony system.

DETAILED DESCRIPTION OF EMBODIMENTS OF THE INVENTION

Embodiments of the invention provide methods and systems for transferring audio content such as a music file to a telephone-switching system. In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

In a communication network, a telephone-switching system is often implemented to manage calls. The telephone-switching system such as Private Branch Exchange (PBX) system switches the calls to desired extensions or places the calls on hold. Moreover, the telephone-switching system plays audio content while a call is being switched or placed on hold. Another use for audio content is to play back the audio content as a prompt for a caller, or user, to perform an action. A source sends the audio content to the telephone-switching system through an electronic message such as e-mail, file transfer protocol (FTP), etc. Thereafter, the telephone-switching system authenticates the source and the audio content. The authenticated audio content is stored in a file directory of the telephone-switching system. In an embodiment of the present invention, the telephone-switching system upgrades (e.g., replaces or modifies) a pre-stored audio content that is stored in the telephone-switching system with the audio content that is received from the source.

Figure 1:
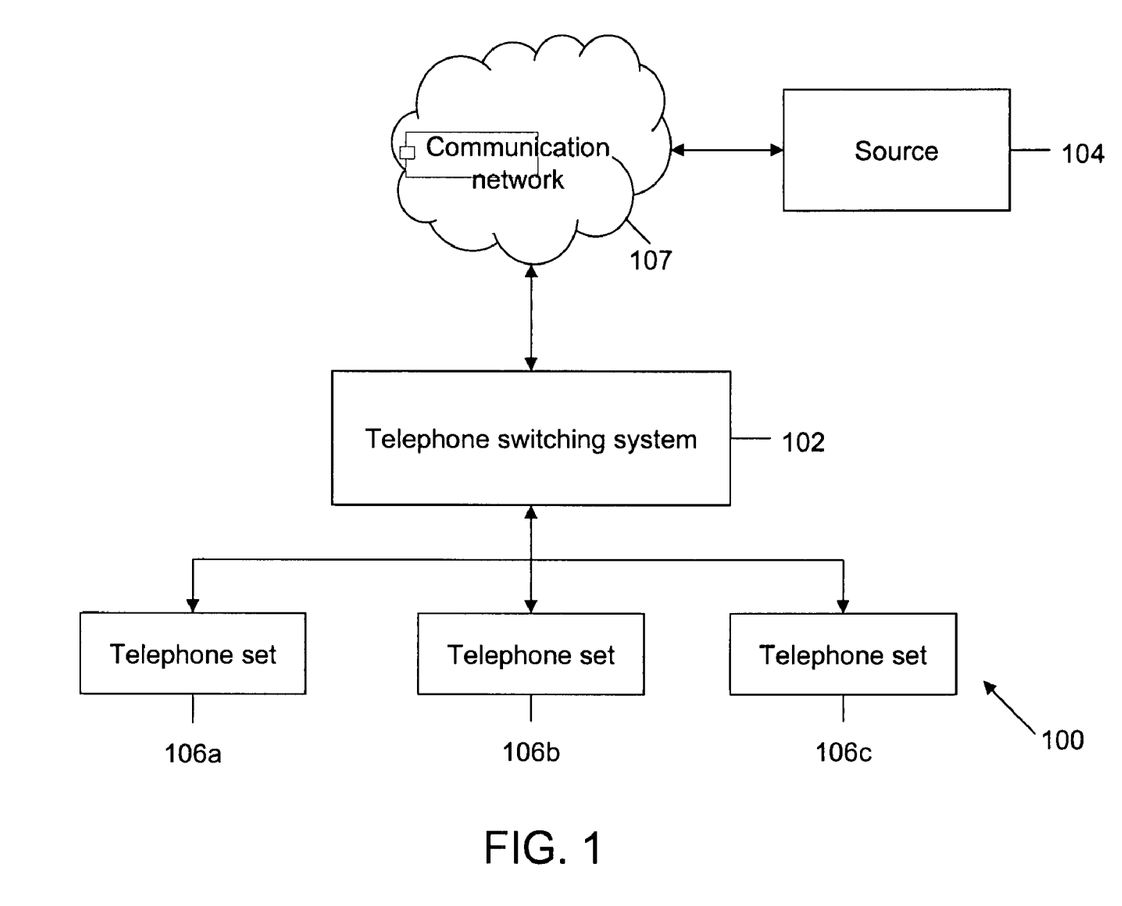
FIG. 1 illustrates an environment for transferring audio content, in accordance with an embodiment of the invention.

Referring now to the drawings, particularly by their reference numbers, FIG. 1 illustrates environment 100 for transferring audio content to telephone-switching system 102, in accordance with an embodiment of the present invention. Environment 100 includes telephone-switching system 102, source 104, telephone sets 106, and a communication network 107. Telephone sets 106 include telephone set 106a, telephone set 106b, and telephone set 106c. Examples of telephone-switching system 102 include but are not limited to a PBX system, a key system and so forth. Telephone-switching system 102 provides an internal network to telephone sets 106 to communicate with each other. For example, telephone-switching system 102 is the PBX system that provides local lines to telephone sets 106, to communicate with each other. The internal network is also known as a private network of telephone-switching system 102.

Moreover, telephone-switching system 102 also provides external lines to telephone sets 106 to make calls outside its private network. These external lines form a public network of telephone-switching system 102. Further, telephone-switching system 102 is connected to source 104 for example, a computer, through communication network 107. Examples of communication network 107 include a packet-switched network such as a Local Area Network (LAN) or a circuit-switched network such as a Public Switched Telephone Network (PSTN) and so forth. A user at source 104 communicates with telephone sets 106 through telephone-switching system 102. Source 104 is in the private network of telephone-switching system 102. In an embodiment of the present invention, source 104 is connected through the public network such as a telephone exchange to telephone-switching system 102. In another embodiment of the present invention, source 104 is more directly connected to telephone-switching system 102. For example a source can be a "thumb" drive or device, dongle, or other small device that is connected to a port (e.g., Universal Synchronous Bus (USB), Ethernet, serial or parallel, etc.) of telephone-switching system 102. In general, devices, communication links, protocols, data definitions and other characteristics can vary from those illustrated herein. For example, a source can use any type of device to originate the audio content such as a laptop computer, personal digital assistant (PDA), cell phone, web browser, etc. Connections can be wired (e.g., electrical, optical) wireless (e.g., infrared, radio-frequency), etc. Any data storage, transfer or processing device or software can be a source. Other functions described herein, such as authentication, can be performed by any suitable device including a device acting as a source.

Figure 2:
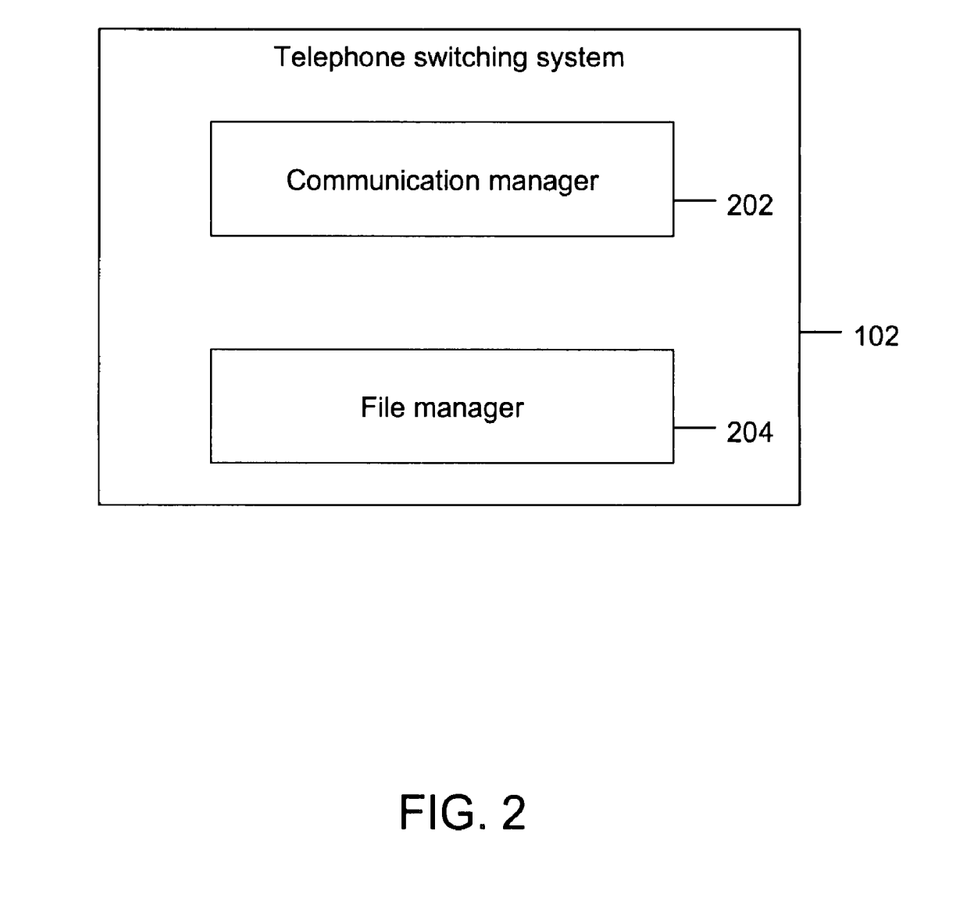
FIG. 2 is a block diagram of a telephone-switching system, in accordance with an exemplary embodiment of the invention.

FIG. 2 is a block diagram of a telephone-switching system 102, in accordance with an exemplary embodiment of the present invention. Telephone-switching system 102 manages calls received on telephone sets 106. For example, telephone-switching system 102 is a PBX system that places a call on hold if the called telephone set, for example telephone set 106a, is busy. Moreover, telephone-switching system 102 plays audio content such as a music file or a recorded voice message, in case the call is placed on hold. The audio content played while the call is placed on hold is also referred to as music on hold (MOH). Telephone-switching system 102 can also play the MOH to greet callers who are making calls to any of telephone sets 106. Audio content can be sent to the PBX for use with a specific one or more users or types of users. The associated users can be designated by an administrator who sends the audio content or by individual users who send the audio content intended for use for a particular individual or group of associated users (or all users).

Telephone-switching system 102 includes a communication manager 202 and a file manager 204. Communication manager 202 is an application-level computer program included in an operating system of telephone-switching system 102. Communication manager 202 receives the audio content from source 104. For example, telephone-switching system 102 is a Cisco Internet Protocol (IP) PBX system that has operating system such as a Cisco Internetworking Operating System (IOS) installed in it. Further, the Cisco IOS includes communication manager 202 as an e-mail client that receives e-mail from source 104. This e-mail includes the audio content as an attachment. File manager 204 manages the audio content that is received by telephone-switching system 102. File manager 204 is an application-level computer program included in operating system of telephone-switching system 102. File manager 204 manages the audio content that is received by communication manager 202. Further, file manager 204 authenticates source 104. For example, file manager 204 verifies the e-mail address or the Internet Protocol (IP) address of source 104. Further, file manager 204 retrieves the audio content from source 104. For example, source 104 uploads the audio content on a mail server. File manager 204 downloads the audio content from the mail server. Moreover, file manager 204 authenticates the audio content. For example, file manager 204 checks the format of the file such as file name of the audio content. Thereafter, file manager 204 stores the audio content on a file directory of telephone-switching system 102. For example, file manager 204 saves the audio content with file name 'call-hold.wma' in a folder named 'call-hold music'. The folder 'call-hold music' is located in the file structure of the operating system on telephone-switching system 102. Thereafter, telephone-switching system 102 stores the audio content on its on-board memory. File manager 204 can also upgrade a pre-stored audio content that is stored in telephone-switching system 102. For example, telephone-switching system 102 contains a pre-stored audio file with file name 'call-hold.wma'. File manager 204 receives the audio content with the file name 'call-hold.wma' and replaces the pre-stored audio file with the received audio content. Additionally, file manager 204 discards the received audio content if source 104 is not authenticated. File manager 204 discards the e-mail sent by source 104 if the e-mail address does not belong to a list of certified e-mail addresses. Moreover, file manager 204 also discards the received audio content that is not authenticated.

Figure 3:
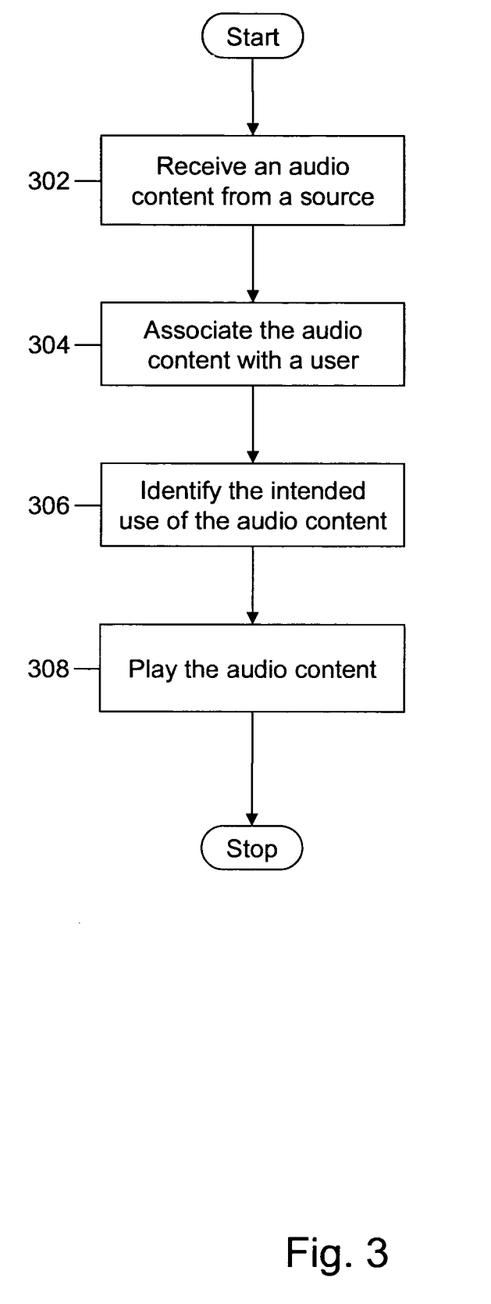
FIG. 3 is a flowchart, illustrating a method for using the audio content in the telephone-switching system, in accordance with an exemplary embodiment of the invention

FIG. 3 is a flowchart of a method for using the audio content in telephone-switching system 102, in accordance with an exemplary embodiment of the invention. At step 302, telephone-switching system 102 receives the audio content from source 104. Source 104 sends an electronic message to telephone-switching system 102. The electronic message includes the audio content. For example, source 104 is a computer that has the audio content stored in it. Moreover, source 104 can also download the audio content from the Internet and attach it to the e-mail that is sent to telephone-switching system 102. Source 104 can also record a voice message to be used as the audio content. The voice message is recorded by a user at source 104. Further, source 104 ensures that the audio content is in a file format that is recognized by telephone-switching system 102. Examples of the audio content include but are not limited to Windows Media Audio (WMA) format, Moving Picture Experts Group Layer-3 Audio (MP3) format and so forth. Source 104 also assigns a pre-defined file name to the audio content. This ensures that the intended purpose of the audio content is recognized at telephone-switching system 102. For example, if the audio content is a recorded voice message that is to be played while the call is placed on hold, then source 104 assigns a name 'call-hold.wma' to the audio content. Thereafter, source 104 attaches the audio content in e-mail and sends the e-mail to telephone-switching system 102. For example, telephone-switching system 102 is a Cisco IP PBX system and source 104 sends the e-mail addressed to cisco-IP-PBX@cisco.com. This e-mail includes the audio content as an attachment and is received by the Cisco IP PBX system. In an embodiment of the present invention, source 104 is the USB dongle that is connected to telephone-switching system 102. Thereafter, telephone-switching system 102 receives the audio content through the USB dongle. For example, a USB dongle that includes the audio content is plugged into a USB port of telephone-switching system 102 such as the PBX system In another embodiment of the present invention, source 104 uploads the audio content on a server. Thereafter, telephone-switching system 102 downloads the audio content from the server. For example, source 104 uploads the audio content on a File Transfer Protocol (FTP) server. Thereafter, telephone-switching system 102 periodically checks for the audio content that is uploaded on the FTP server and downloads the uploaded audio content. In yet another embodiment of the present invention, source 104 sends the audio content to a mail server. Telephone-switching system 102 uses an e-mail client to periodically check for the audio content that is sent on the mail server. The e-mail client resides in the operating system of telephone-switching system 102. The e-mail client uses a mail protocol to retrieve mails from the mail server. Examples of mail protocols include but are not limited to a Simple Mail Transfer Protocol (SMTP), a Post Office Protocol 3 (POP3), an Internet Message Access Protocol (IMAP) and so forth. In yet another embodiment of the present invention, telephone-switching system 102 is connected to a peer-to-peer (P2P) network. Moreover, source 104 is also connected to the P2P network and sends the audio content by using the P2P network. For example, telephone-switching system 102 and source 104 are connected to Napster network. Telephone-switching system 102 downloads the audio content by using Napster from source 104.

Figure 4A:
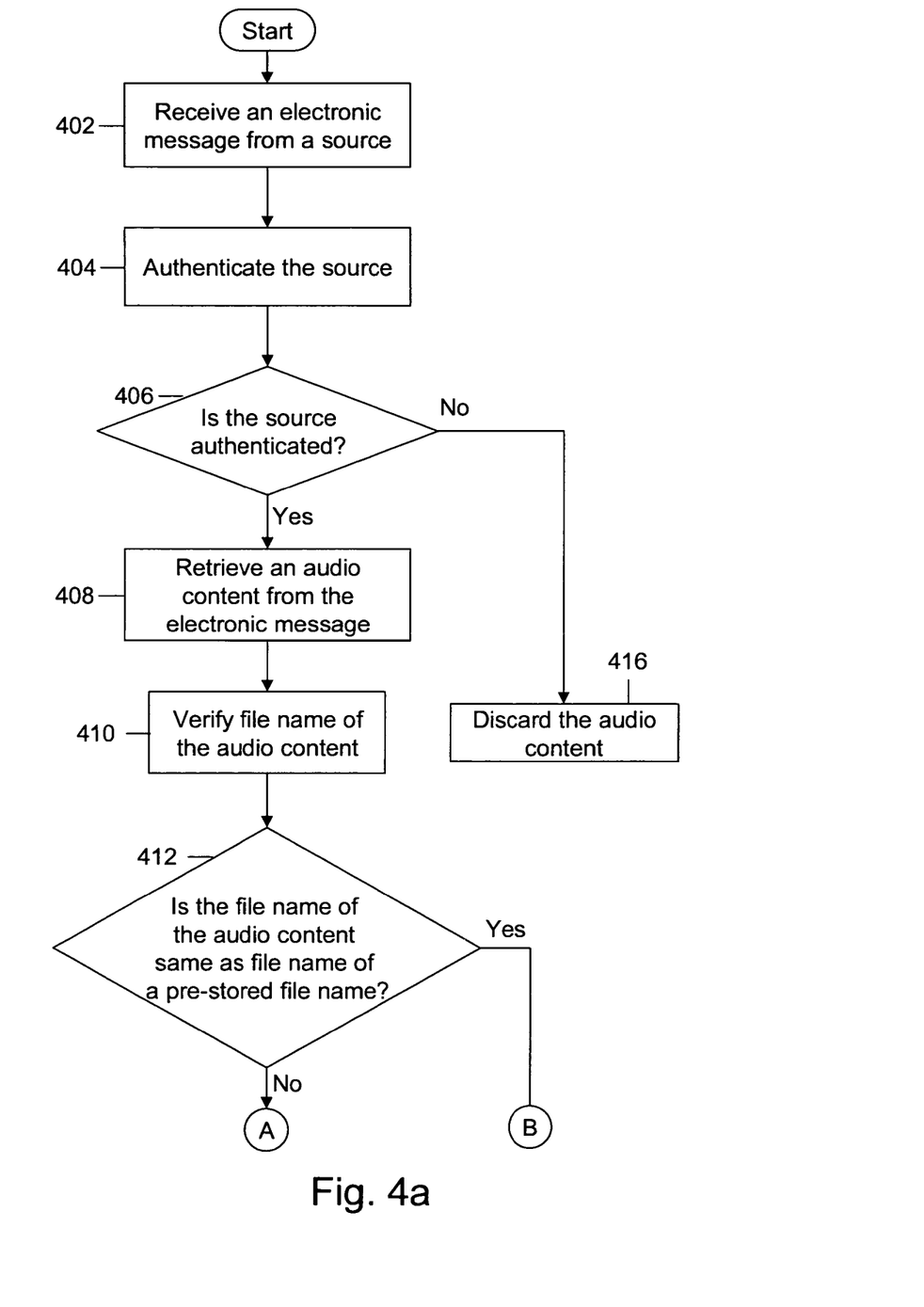
FIG. 4a is a first portion of a flowchart illustrating a method for transferring the audio content to the telephone-switching system, in accordance with another exemplary embodiment of the invention.
Figure 4B:
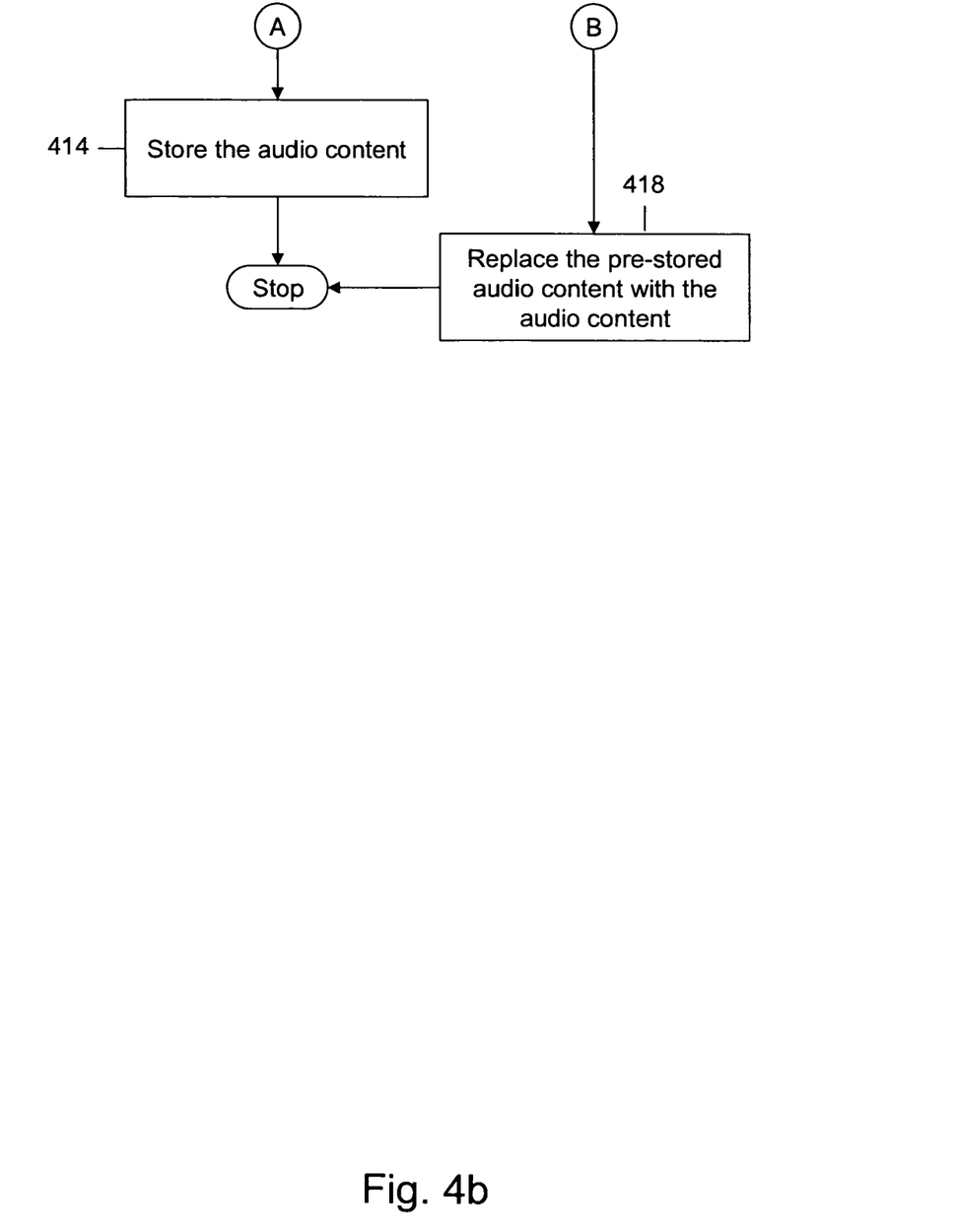
FIG. 4b is a second portion of a flowchart illustrating a method for transferring the audio content to the telephone-switching system, in accordance with another exemplary embodiment of the invention.

At step 304, telephone-switching system 102 associates the audio content with a user. In an embodiment of the present invention, the user is a caller at source 104. The audio content includes indication of the user. For example, the user sends an e-mail with the audio content to telephone-switching system 102. The telephone-switching system 102 associates the received audio content with the e-mail address of the user. At step 306, telephone-switching system 102 identifies the intended use of the audio content. For example, telephone-switching system 102 identifies the audio content with a file name 'call-hold.wma' as the file that is to be played during the call is placed on hold. Further, at step 308, telephone-switching system 102 plays the audio content. For example, telephone-switching system 102 plays the file 'call-hold.wma' when the user places a call on hold FIG. 4 is a flowchart of a method for transferring the audio content to the telephone-switching system, in accordance with another exemplary embodiment of the invention. At step 402, telephone-switching system 102 receives an electronic message such as an e-mail from source 104. This e-mail includes the audio content as an attachment. At step 404, telephone-switching system 102 authenticates source 104. In a preferred embodiment of the invention, telephone-switching system 102 authenticates an e-mail address of source 104. For example, telephone-switching system 102 can verify that the e-mail address of source 104 belongs to a list of authorized senders. The list of authorized senders indicates authorized e-mail addresses that have the right to send the audio content to telephone-switching system 102. In another embodiment of the present invention, telephone-switching system 102 authenticates the IP address of source 104. For example, telephone-switching system 102 can verify that the IP address of source 104 belongs to a list of authorized IP addresses. The list of authorized IP addresses indicates authorized IP addresses that have the right to send the audio content to telephone-switching system 102. In another embodiment of the present invention, telephone-switching system 102 can authenticate source 104 by verifying pre-defined username and password assigned to source 104. At step 406, it is checked that source 104 is authenticated or not. At step 408, telephone-switching system 102 retrieves the audio content from the electronic message. For example, a mail client installed on the operating system of telephone-switching system 102 can download the audio content from the e-mail. Further, at step 410, telephone-switching system 102 authenticates the audio content. For example, telephone-switching system 102 checks the format of the file such as file name of the audio content. At step 412, telephone-switching system 102 checks that the file name of the audio content is the same as the file name of a pre-stored audio content. Telephone-switching system 102 can search file names of pre-stored files and compare the searched file names with the file name of the received audio content. At step 414, telephone-switching system 102 stores the audio content on a file directory of telephone-switching system 102 if the audio content is authenticated. For example, telephone-switching system 102 stores the audio content in a file structure of the operating system on telephone-switching system 102. Thereafter, the audio content gets stored on the on-board memory of telephone-switching system 102. The file structure helps in organizing the files with different file formats. The file structure contains a directory of folder and file names. Telephone-switching system 102 stores the audio content, based on the file format of the audio content. The audio content is stored in a pre-assigned folder. For example, telephone-switching system 102 verifies the file name of the audio content. Thereafter, telephone-switching system 102 identifies a location for saving the audio content. For example, the audio content that is played during the call is placed on hold is stored in the folder named 'call-hold'.

Further, at step 406, if source 104 is not authenticated, then step 416 is performed. At step 416, telephone-switching system 102 discards the audio content. For example, telephone-switching system 102 receives an e-mail that has the audio content and this e-mail address that is not authorized to send the audio content to telephone-switching system 102. Telephone-switching system 102 considers this as a spam e-mail and discards the e-mail along with its audio content.

Further, at step 418, telephone-switching system 102 replaces the pre-stored audio content with the received audio content if the file name of the pre-stored audio content is the same as the file name of the received audio content.

According to various embodiments of the present invention, a method for using audio content in a telephone switching system is provided. The method comprises receiving the audio content from a source; associating the audio content with a user; using identification information transferred with the audio content to designate an intended use of the audio content; and playing back the audio content during a call with the associated user, wherein the playing back is in accordance with the intended use.

In another embodiment of the present invention, a method for transferring audio content to a telephone-switching system is provided. The method comprises receiving the audio content from a source; authenticating the source; authenticating the audio content if the source is authenticated; and storing the audio content in a file directory of the telephone-switching system if the audio content is authenticated. In yet another embodiment of the present invention, a method for updating a pre-stored audio content in a telephone-switching system is provided. The method comprises receiving an electronic message from a source wherein the electronic message includes a received audio content; associating the received audio content with a user; using identification information transferred with the received audio content to designate an intended use of the received audio content; playing back the received audio content during a call with the associated user, wherein the playing back is in accordance with the intended use; upgrading the pre-stored audio content in a file directory of the telephone-switching system, the upgrading the audio content including: verifying a file name of the pre-stored audio content; and replacing the pre-stored audio content with the received audio content if the file name of the pre-stored audio content is the same as a name in the identification information.

In yet another embodiment of the present invention, a system for transferring audio content to a telephone-switching system is provided. The system comprises, a communication manager for receiving the audio content from a source; and a file manager for managing the audio content, the file manager comprising: means for receiving the audio content from a source; means for associating the audio content with a user; means for using identification information transferred with the audio content to designate an intended use of the audio content; and means for playing back the audio content during a call with the associated user, wherein the playing back is in accordance with the intended use.

In other embodiments of the present invention, an apparatus for transferring audio content to a telephone-switching system is provided. The apparatus comprising a processing system including a processor coupled to a display and user input device; a machine-readable medium including instructions executable by the processor comprising: one or more instructions for receiving the audio content from a source; one or more instructions for associating the audio content with a user; one or more instructions for using identification information transferred with the audio content to designate an intended use of the audio content; and one or more instructions for playing back the audio content during a call with the associated user, wherein the playing back is in accordance with the intended use.

Embodiments of the present invention provide a method and a system for the convenient transfer of audio content to a telephone-switching system by using e-mail. The embodiments of the present invention also provide a method and system for upgrading a pre-stored audio content in the telephone-switching system by using e-mail. In an embodiment of the invention, the telephone-switching system transfers the audio content to the telephone-switching system without physically connecting a computer with the telephone-switching system. Embodiments of the present invention provide a mechanism for the transfer of audio content without opening an application or an administrative session for storing or upgrading the audio content in the telephone-switching system. For example, the mechanism upgrades or stores the audio content in the telephone-switching system without requiring the need for manually launching an application to upgrade the audio content on the telephone-switching system. Further, the embodiments of the invention utilize the ubiquity of the e-mail to transfer the audio content.

Although the invention has been discussed with respect to specific embodiments thereof, these embodiments are merely illustrative, and not restrictive, of the invention. For example, a 'method for transferring audio content to a telephone-switching system' can include any type of analysis, manual or automatic, to anticipate the needs of transferring.

Although specific protocols have been used to describe embodiments, other embodiments can use other transmission protocols or standards. Use of the terms 'peer', 'client', and 'server' can include any type of device, operation, or other process. The present invention can operate between any two processes or entities including users, devices, functional systems, or combinations of hardware and software. Peer-to-peer networks and any other networks or systems where the roles of client and server are switched, change dynamically, or are not even present, are within the scope of the invention.

Any suitable programming language can be used to implement the routines of the present invention including C, C++, Java, assembly language, etc. Different programming techniques such as procedural or object oriented can be employed. The routines can execute on a single processing device or multiple processors. Although the steps, operations, or computations may be presented in a specific order, this order may be changed in different embodiments. In some embodiments, multiple steps shown sequentially in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Although specific types of software such as a "file manager" may be discussed as performing certain functions, other embodiments may perform such functions in other software or devices or a combination of both, as desired.

A 'computer' for purposes of embodiments of the present invention may include any processor-containing device, such as a mainframe computer, personal computer, laptop, notebook, microcomputer, server, personal data manager or 'PIM' (also referred to as a personal information manager), smart cellular or other phone, so-called smart card, set-top box, or any of the like. A 'computer program' may include any suitable locally or remotely executable program or sequence of coded instructions, which are to be inserted into a computer, well known to those skilled in the art. Stated more specifically, a computer program includes an organized list of instructions that, when executed, causes the computer to behave in a predetermined manner. A computer program contains a list of ingredients (called variables) and a list of directions (called statements) that tell the computer what to do with the variables. The variables may represent numeric data, text, audio or graphical images. If a computer is employed for presenting media via a suitable directly or indirectly coupled input/output (I/O) device, the computer would have suitable instructions for allowing a user to input or output (e.g., present) program code and/or data information respectively in accordance with the embodiments of the present invention.

A 'computer readable medium' for purposes of embodiments of the present invention may be any medium that can contain, store, communicate, propagate, or transport the computer program for use by or in connection with the instruction execution system apparatus, system or device. The computer readable medium can be, by way of example only but not by limitation, an electronic, magnetic, optical, electromagnetic, infrared, or semiconductor system, apparatus, system, device, propagation medium, or computer memory.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

Further, at least some of the components of an embodiment of the invention may be implemented by using a programmed general-purpose digital computer, by using application specific integrated circuits, programmable logic devices, or field programmable gate arrays, or by using a network of interconnected components and circuits. Connections may be wired, wireless, by modem, and the like.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims.

What is claimed is:

1. A method for transferring an audio content to a telephone-switching system, the method comprising:
   receiving the audio content from a source;
   authenticating the source;
   authenticating the audio content if the source is authenticated; and
   storing the audio content in a file directory of the telephone-switching system if the audio content is authenticated.

2. The method of claim 1, wherein the authenticating the source comprises verifying an Internet Protocol (IP) address of the source.

3. The method of claim 1, wherein the authenticating the source comprises verifying an E-mail address of the source.

4. The method of claim 1, wherein the storing the audio content comprises further comprising discarding the audio content if the source is not authenticated.

5. The method of claim 1, further comprising discarding the audio content if the audio content is not authenticated.

6. The method of claim 1, further comprising:
   verifying a file format of the audio content; and
   saving the audio content in a file directory of the telephone-switching system based on the verified file format of the audio content.

7. The method of claim 6, wherein the saving the audio content comprises:
   Replacing a pre-stored audio content with the audio content received from the source if a file name of the pre-sore audio content is the same as a file name of the received audio content.

8. A method for updating a pre-stored audio content in a telephone-switching system, the method comprising:
   receiving an electronic message from a source wherein the electronic message includes a received audio content;
   authenticating the source;
   authenticating the received audio content if the source is authenticated;
   using identification information transferred with the received audio content to designate an intended use of the received audio content; and
   storing the received audio content in a file directory of the telephone-switching system based on a determination that the audio content is authenticated, the received audio content replacing a pre-stored audio content in the file directory based on a determination that a file name of the pre-stored audio content is the same as a name in the identification information.

9. The method of claim 8, further comprising discarding the received audio content if the source is not authenticated.

10. The method of claim 1, wherein the audio content is received from a Universal Serial Bus (USB) dongle, the USB dongle being connected to the telephone-switching system.

11. The method of claim 1, wherein the source is connected to the telephone-switching system through a peer-to-peer (P2P) network.

12. The method of claim 1, wherein receiving the audio content comprises: receiving an electronic message from the source, the electronic message including the audio content.

13. The method of claim 12, wherein the electronic message is an email message.

14. The method of claim 12, wherein the electronic message is transferred via file transfer protocol.

15. The method of claim 12, wherein the electronic message includes an indication of the associated user.

16. The method of claim 12, wherein the electronic message includes the identification.

17. The method of claim 1, wherein an intended use for the audio content includes playing the audio content while the associated user is on hold.

18. The method of claim 1, wherein an intended use for the audio content includes playing the audio content as a voice prompt.

19. The method of claim 8, wherein the electronic message is an e-mail message.

20. The method of claim 8, wherein the electronic message is transferred via file transfer protocol.

21. A mechanism configured to transfer an audio content to a telephone-switching system, the method comprising:
   a first mechanism that is configured to receive the audio content from a source;
   a second mechanism that is configured to authenticate the source;
   a third mechanism that is configured to authenticate the audio content if the source is authenticated by the second mechanism; and
   a fourth mechanism that is configured to store the audio content in a file directory of the telephone-switching system if the audio content is authenticated by the third mechanism.

22. A mechanism configured to transfer an audio content to a telephone-switching system, the method comprising:

a first mechanism that is configured to receive the audio content from a source;
a second mechanism that is configured to authenticate the source;
means for authenticating the audio content if the source is authenticated by the second mechanism; and
a fourth mechanism that is configured to store the audio content in a file directory of the telephone-switching system if the audio content is authenticated.

* * * * *